United States Patent [19]

D'Aloia

[11] 4,022,340

[45] May 10, 1977

[54] BIN FOR MAIL SORTING APPARATUS

[75] Inventor: Andrew D'Aloia, New York, N.Y.

[73] Assignee: American Technical Industries, Inc., Mount Vernon, N.Y.

[22] Filed: Aug. 12, 1975

[21] Appl. No.: 603,816

[52] U.S. Cl. .............................. 214/307; 214/11 R

[51] Int. Cl.$^2$ .................... B65B 21/02; B65G 43/00

[58] Field of Search ................. 214/11 R, 302, 307; 198/38, 141-143; 49/386; 220/335; 298/24-27, 29-37; 209/71-73, 74 R, 74 M

[56] References Cited

UNITED STATES PATENTS

| | | | |
|---|---|---|---|
| 1,720,789 | 7/1929 | Heusser | 220/335 |
| 2,764,275 | 9/1956 | Lens | 198/143 |
| 3,144,948 | 8/1964 | Henig | 214/11 R |
| 3,318,435 | 5/1967 | Scott | 198/38 |
| 3,563,479 | 2/1971 | Brouwer | 198/38 X |
| 3,573,748 | 4/1971 | Holme | 214/11 X |

*Primary Examiner*—Robert J. Spar
*Assistant Examiner*—P. B. Johnson
*Attorney, Agent, or Firm*—Hopgood, Calimafde, Kalil, Blaustein & Lieberman

[57] ABSTRACT

A bin used in mail sorting apparatus includes a plurality of parallel vertical slots. The bottom of each slot is closed by a pivotably movable door. A tab is integrally formed with the door having a first part that is at a right angle to the door and a second part extending from the first part and parallel to the door. The tab is engaged by a resiliant damping means which prevents objectionable noise and vibration when the door is opened.

1 Claim, 6 Drawing Figures

BIN FOR MAIL SORTING APPARATUS

BACKGROUND OF THE INVENTION

The present invention relates to a bin for use in a mail sorting apparatus, and more particularly to such a bin having a new and improved damping means to prevent noise and vibration.

Mail sorting apparatus, such as those currently in use by the United States Post Office, employ bins or carts that are supported on rollers and travel through the sorting system on tracks. Each bin includes a plurality of parallel vertical slots. Mail is deposited in the slots through their respective open top ends. As the bin passes over a location corresponding to the destination of a letter contained therein, a pivotable movable door that closes the bottom of the slot is opened, thus allowing the mail carried in that slot to drop.

When a door is allowed to open under the force of the associated spring, the resulting metal-on-metal impact causes a loud unpleasant noise. Moreover, vibrations are produced within the bin that loosen screws and cause maintenance problems. Since each mail sorting system includes many such bins each having a plurality of doors closing at a rapid rate, the noise and maintenance problems are severe.

A solution to the above problem that has been partially implemented by the United States Post Office utilizes a tab extending from one end of each door. The door, including the tab, forms a flat planar object. Notches are cut in a side wall of the bin to permit each tab to extend to the exterior thereof. The tabs are held between two torsion springs that damp vibrations and noise when the door slams shut. The springs associated with each door are carried by an arm supported by the axle about which an adjacent door is pivotable. Of course, the arm for the last door of the bin must be supported by a pin provided specifically for that purpose.

SUMMARY OF THE INVENTION

The present invention is an improvement over previously known mail sorting bins. It differs from the above described construction, in that the tab engaged by the damping means has a first part that extends at a right angle to the door and a second part that extends from the first part parallel to the door. This arrangement eliminates the need for notches in the side of the bin to accomodate the tabs. Also, because the portion of the tab that is parallel to the door is offset from the door by the length of the first part of the tab, mail cannot be jammed or delayed within the slot as a result of engaging the tab.

Another advantage of the present invention is that it can be made by modifying an existing bin that does not have damping means since no notches in the side wall of the bin are required.

Another aspect of the invention resides in the mounting of the damping means. The damping means for each door is carried by an arm supported by the axle of an adjacent roller, and the need for a separate pin to hold one or more arms is thus eliminated. In this way, the number of parts is minimized without sacrificing any function of the device and conversion of existing bins is made easier.

BRIEF DESCRIPTION OF THE DRAWINGS

For a more complete understanding of the invention, reference may be made to the detailed description below taken in conjunction with the accompanying drawings wherein.

DESCRIPTION OF THE PREFERRED EMBODIMENT

Figure 1:
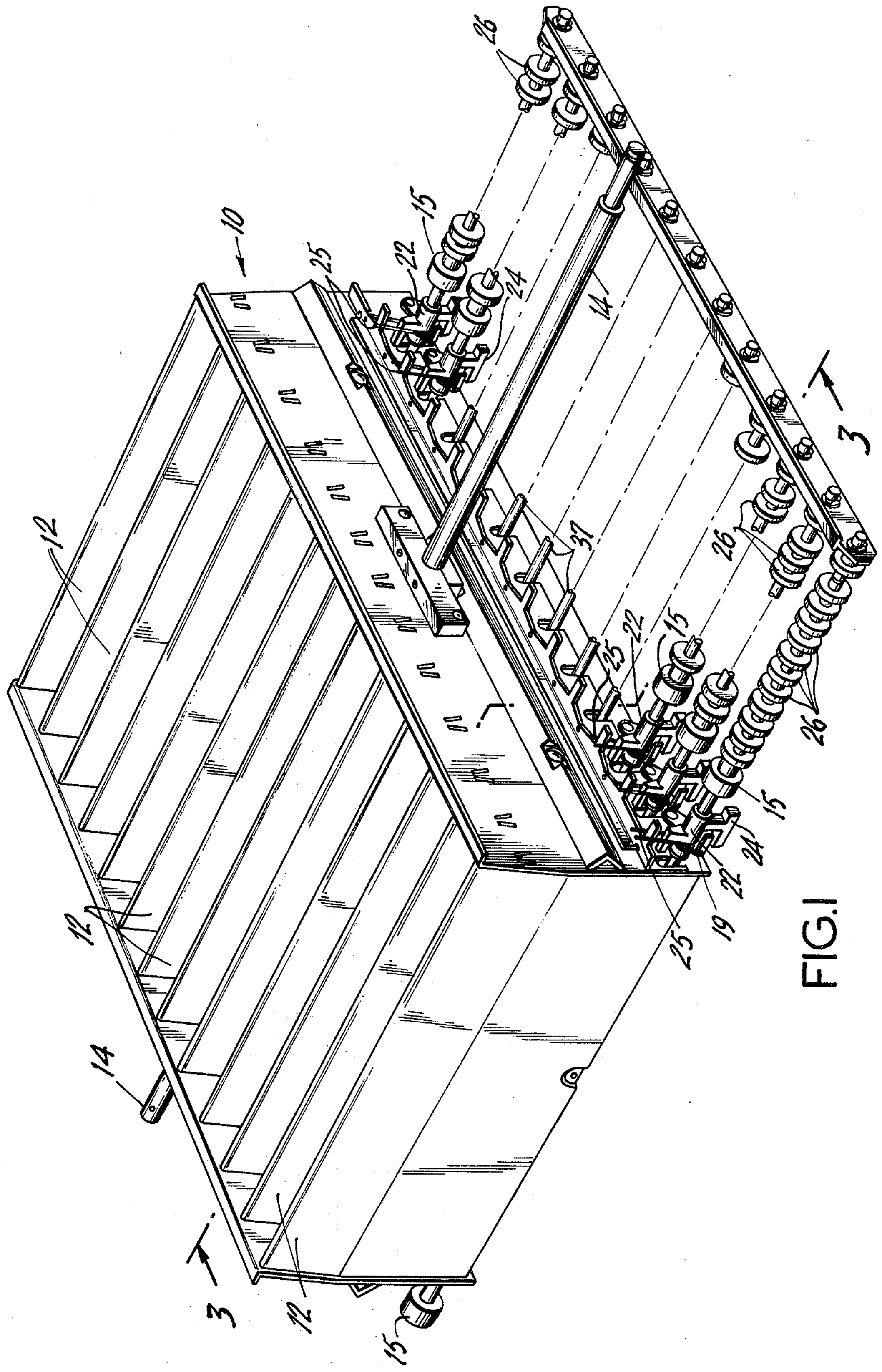
FIG. 1 is a three dimensional pictorial view of a bin for use in mail sorting apparatus constructed in accordance with the present invention.

FIG. 1 is a pictorial view of a box-like bin 10 used in a mail sorting apparatus and constructed in accordance with the invention. The bin 10 includes a plurality of parallel vertical mail slots 12 each of which is open at its top end. The bin 10 is supported by a shaft 14 extending transversely therethrough and a plurality of rollers 15 positioned on both sides to facilitate movement along the tracks of a mail sorting system.

Figure 6:
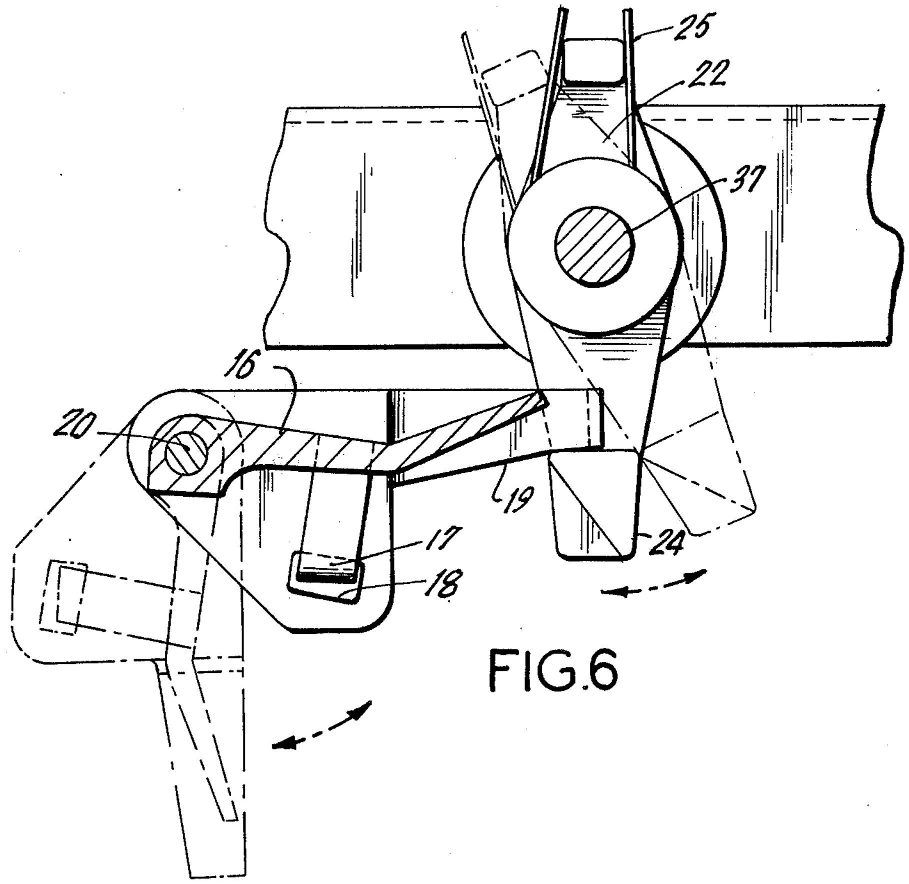
FIG. 6 is a side view of a closed door of the bin of FIG. 1 showing the door in an open position in phantom lines.

FIG. 6 shows one side of a portion of the bin 10 including the end of a representative door 16 pivotable about an axis contiguous with one edge thereof. Each door 16 is connected by a tab 17 inserted in a slot 18 of a lever 19. The door 16 is thus held by the lever 19 to prevent pivoting about an axle 20 to drop the mail contained within above the mail slot 12. Each lever 19 is in turn held with the door 16 in a closed position by a pivotable rocker arm 22 which carries an integrally formed cam 24 that engages the end of the lever 19. FIG. 6 also shows a door 16 (in phantom lines) in an open position after release of the lever 19 by the pivotal movement of the rocker arm 22. A spring 25 biases the arm 22 toward a position (shown in solid lines) in which it engages the lever 19 and holds the door 16 in a closed position.

The arms 22 are actuated by axially movable coding rollers 26 operated in accordance with a predetermined coding system to bring about sorting by dropping mail into appropriate accumulating locations below. A description of a particular coding system is beyond the scope of this invention, but such systems are in wide use today and are known to those skilled in the art.

Figure 2:
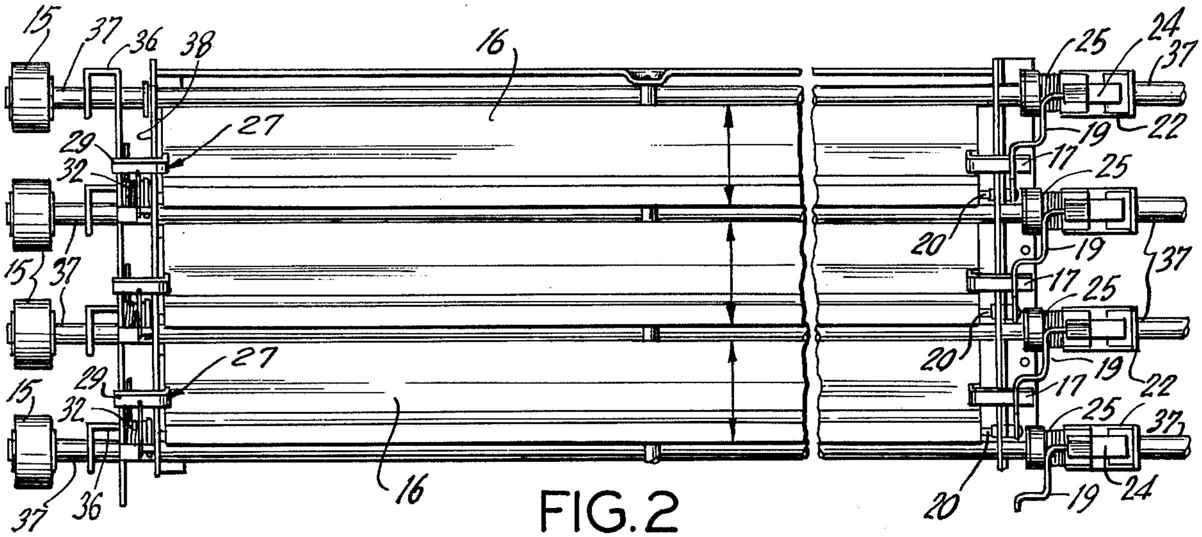
FIG. 2 is a bottom view of a segment of the bin of FIG. 1 showing three representative doors of the bin.

FIG. 2 shows the bottom of a section of the bin 10 including three doors 16 in the closed position. The springs 25 then bias the arms 22 toward a position in which they engage the levers 19 are shown more clearly here.

Figure 4:
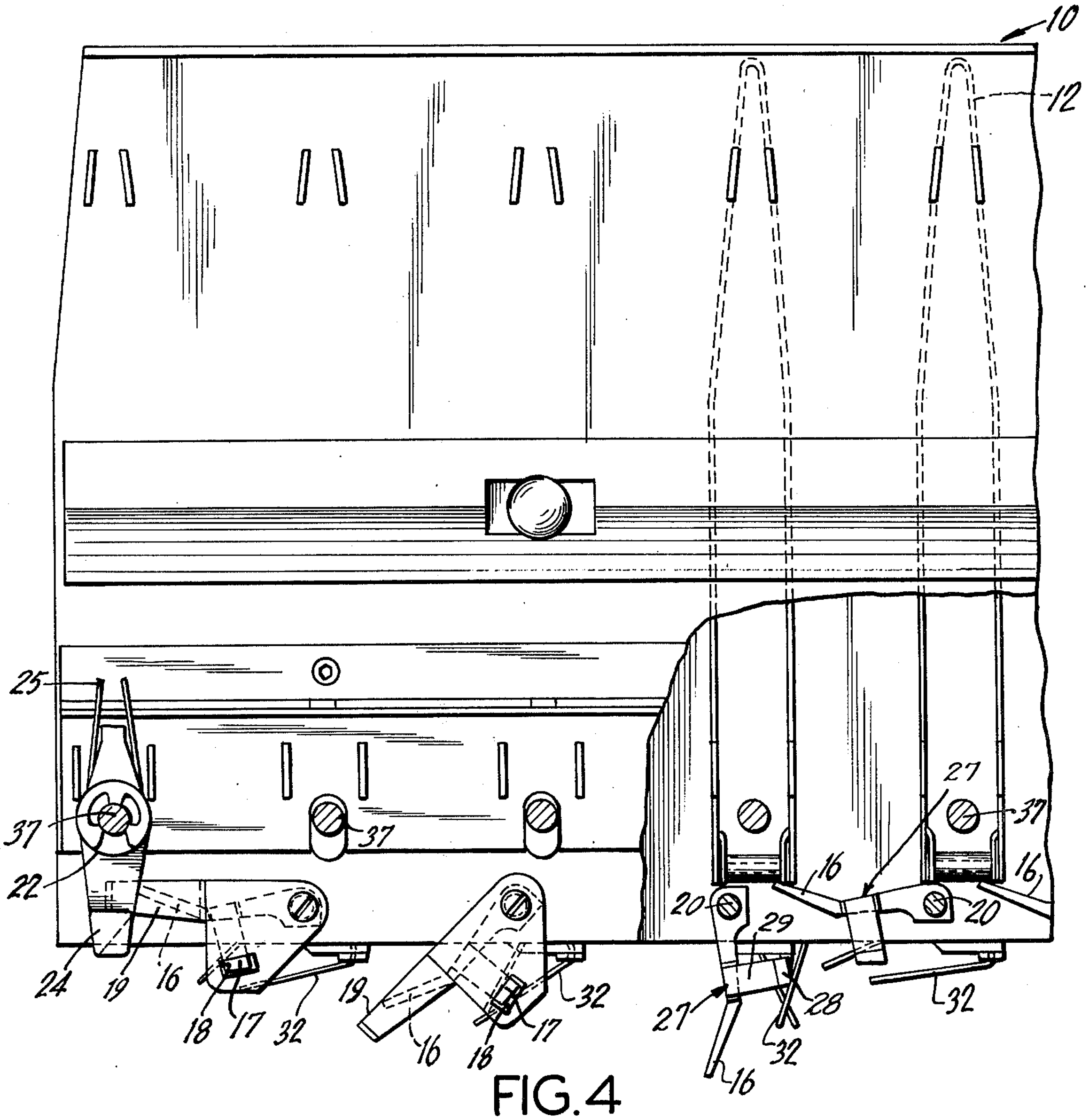
FIG. 4 is a partially broken away side view of a segment of the bin of FIG. 1.
Figure 3:
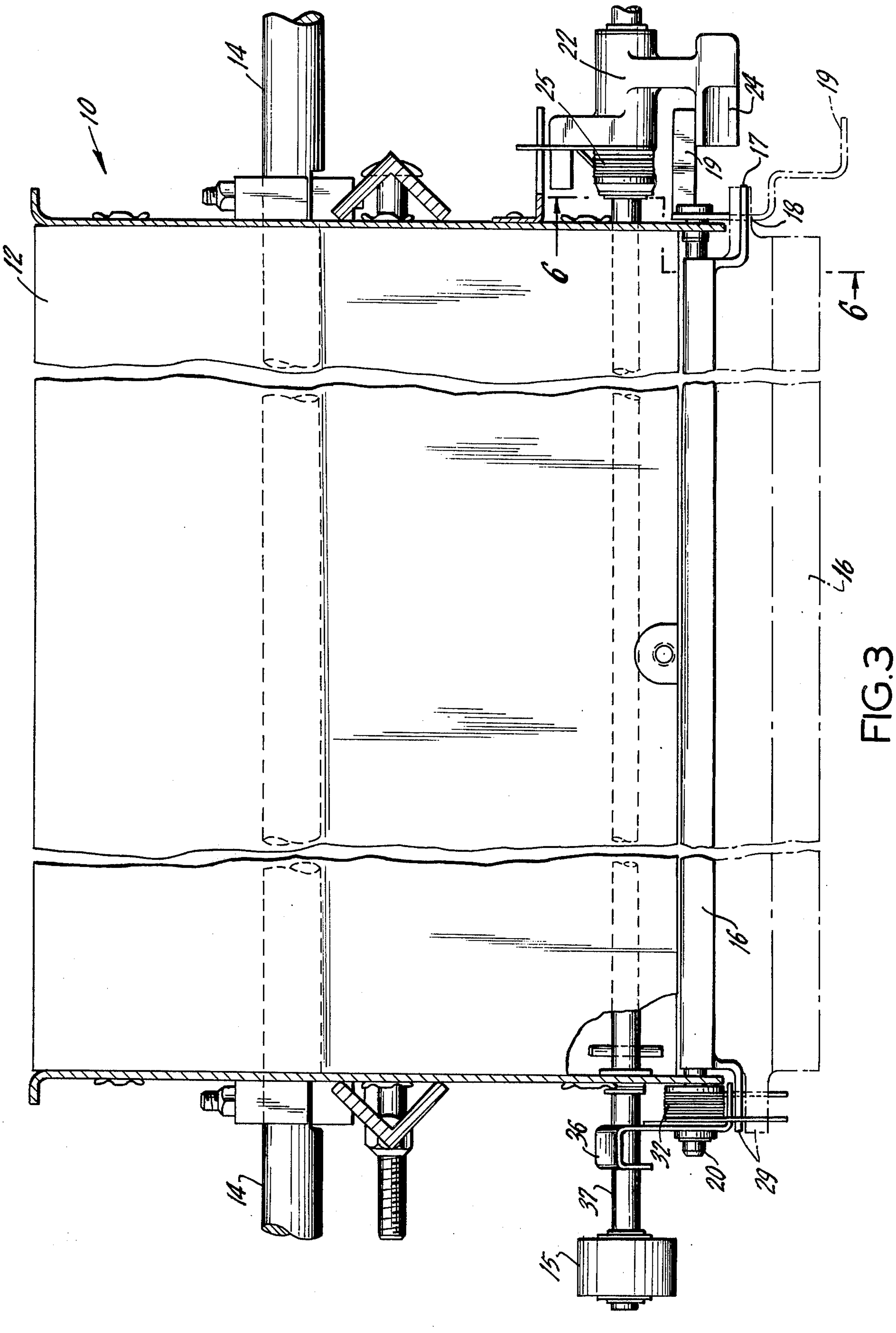
FIG. 3 is a cross-sectional view of the bin of FIG. 1 taken along the line 3—3.
Figure 5:
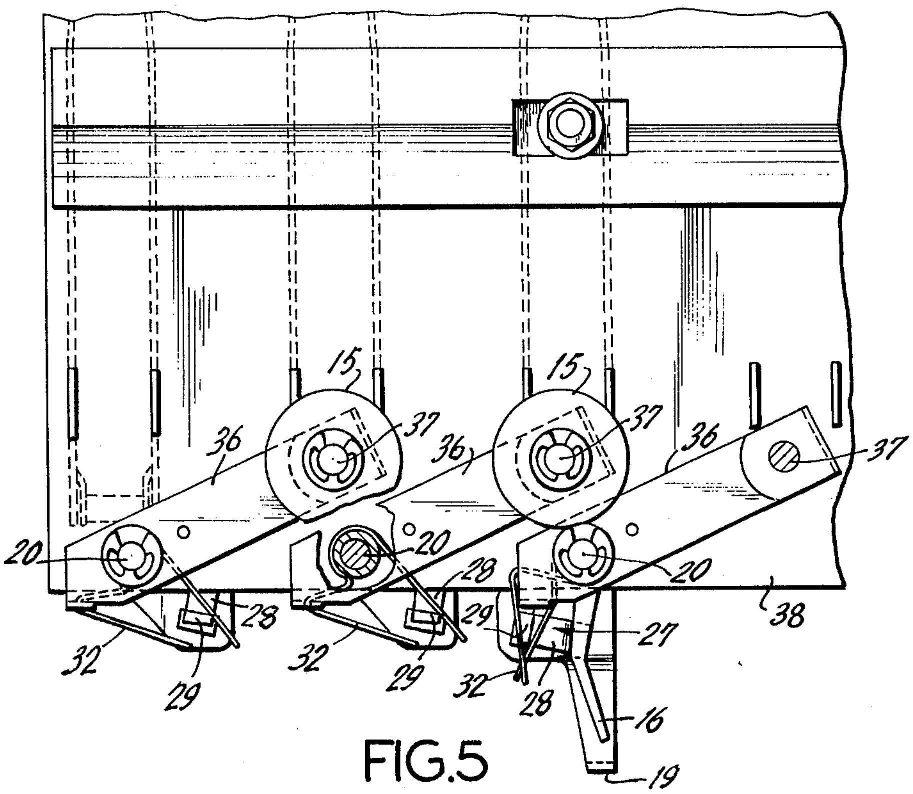
FIG. 5 is a view of a segment of a side of the bin of FIG. 1 opposite the side shown in FIG. 4.

Each door 16, at the end opposite the spring 25, includes an integrally formed tab 27 shown in FIG. 5. A view of this tab 27 form the interior of the bin 10 is shown in the lower right hand broken away portion of FIG. 4. The tab 27 includes a first part 28 extending downwardly from the major panel of the door 16 (in its closed position) and at a right angle thereto. A second part 29 of the tab 27 extends from the first part 28 at an angle thereto and parallel to the major panel of the door 16. The second part 29 is engaged between two oppositely biased ends of a torsion spring 32 (see FIG. 2) one end of which is held in a fixed position by arm 36. The arm 36 is, in turn, mounted on the end of an axle 37 that supports an adjacent roller 15. When the door 16 is moved between an open and a closed position, the spring 32 and the arm 36 not only serves to bias the door 16 toward its open position but also function as a damping means which greatly reduces the noise that would otherwise result when the door 16 impacts any metal stopping surface such as the bottom edge 38 of the bin 10. The damping means also eliminates or reduces the tendency of the vibrations resulting from the impact of an opening door from loosening screws and other parts of the bin 10.

The bin 10 described above operates as follows. It rides along the tracks of a mail sorting system supported by the rollers 15 and propelled by the transverse shaft 14. Mail is held in the various slots 12, segregated by dentination. The destination associated with each slot 12 is indicated by the positions of the adjacent set of coding rollers 26. All the doors 16 are normally held in a closed position by the engagement of the rocker arms 22 with the levers 19.

As a door 16 passes over a location at which its contents is to be dropped, the free end of the associated rocker arm 22 is moved causing the cam 24 of that arm 22 to disengage the lever 19. The door 16 is thus permitted to open under the force of the spring 32. Since the tab 29 of the door 16 remains between the ends of the spring 32, noise and vibrations are damped. All the doors 16 thus opened are closed when the bin passes a protruding member which is arranged along the track of the mail sorting system so that it will engage the open doors 16. This closing apparatus, while not shown in the drawings, is well known to those skilled in the art.

The above description of a preferred embodiment of the invention is meant to be merely exemplary and is set forth to illustrate the principals of the invention. Numerous modifications and variations of the invention will, of couse, occur to those skilled in the art.

I claim:

1. A mail transporting bin defining a plurality of parallel vertical mail holding slots each such slot being open at its top end, a normally closed pivotably movable door closing each slot along its bottom end, each movable door being pivotable about an axis substantially contiguous with one longitudinal edge thereof, and a lever rigidly affixed to one end of the door whereby said door may be held in a closed position, wherein the improvement comprises a tab integrally formed with the door at the end opposite the lever said tab having a first part extending at a right angle to the door and a second part extending from the first part and parallel to the door, resilient door opening and damping means including a spring engaging the second part of the tab for biasing the door toward an open position and for preventing noise and vibration upon the opening movement of the door, a plurality of rollers, a plurality of axles supporting the rollers the number of such axles being equal to the number of doors, and an arm attached to each such axle for holding one end of the spring in a fixed position.

* * * * *